United States Patent [19]
Kolycheck

[11] 3,923,747
[45] Dec. 2, 1975

[54] POLY(CAPROLACTONE)BASED POLYURETHANES HAVING IMPROVED BLOCKING CHARACTERISTICS

[75] Inventor: Edmond G. Kolycheck, Lorain, Ohio

[73] Assignee: The B. F. Goodrich Company, Akron, Ohio

[22] Filed: Nov. 23, 1973

[21] Appl. No.: 418,551

[52] U.S. Cl. ............... 260/77.5 AN; 117/161 KP; 260/30.4 N; 260/32.6 N; 260/32.8 N; 260/33.6 UB; 260/46.5 E
[51] Int. Cl.² .................. C08G 18/42; C08G 18/61
[58] Field of Search ............... 260/77.5 AN, 2.5 AN

[56] References Cited
UNITED STATES PATENTS

| | | |
|---|---|---|
| 3,591,561 | 7/1971 | Kazama et al. ............. 260/77.5 AN |
| 3,660,357 | 5/1972 | Kolycheck ................... 260/77.5 AN |
| 3,666,724 | 5/1972 | Hostettler .................... 260/77.5 AN |
| 3,741,918 | 6/1973 | Koleske et al. .............. 260/77.5 AN |
| 3,775,354 | 11/1973 | Hostettler et al. ........... 260/77.5 AN |
| 3,806,473 | 4/1974 | Lombardi et al. ........... 260/77.5 AN |

*Primary Examiner*—H. S. Cockeram
*Attorney, Agent, or Firm*—J. Hughes Powell, Jr.

[57] ABSTRACT

Improved polyurethanes having high tensile strength and modulus, good light stability, good blocking characteristics and that are soluble in inexpensive solvents are obtained by reacting together a hydroxyl-terminated polyester, a poly(epsilon-caprolactone)diol, an aliphatic diol containing at least 5 carbon atoms, a hydroxyl-terminated dimethyl polysiloxane and an acyclic or alicyclic diisocyanate.

5 Claims, No Drawings

POLY(CAPROLACTONE)BASED POLYURETHANES HAVING IMPROVED BLOCKING CHARACTERISTICS

BACKGROUND OF THE INVENTION

Polyurethanes are valuable polymers. Because of the toughness and abrasion resistance of certain polyurethanes, they are used to coat fabric for upholstery, garments and the like. The primary method for coating fabrics with polyurethanes is a transfer coating process employing a solution of the polyurethane in a solvent.

For economical reasons, inexpensive solvents are required and the polyurethane should have an unusual balance of physical properties including high tensile strength, high modulus, solubility in inexpensive solvents, light stability and have good blocking characteristics. It is an objective of this invention to provide a novel and improved polyurethane having these characteristics particularly, improved blocking characteristics.

SUMMARY OF THE INVENTION

Improved polyurethanes having high tensile strength and modulus, good light stability, good blocking characteristics and that are soluble in inexpensive solvents are obtained by reacting together a hydroxyl-terminated polyester, having a molecular weight of about 600 to 1200, a poly(epsilon-caprolactone)diol having a molecular weight of about 400 to 600, an aliphatic diol containing at least 5 carbon atoms, a blend of these three hydroxyl-terminated materials have an average molecular weight of about 350 to 500, a hydroxyl-terminated dimethyl polysiloxane and an acyclic or alicyclic diisocyanate.

DETAILED DESCRIPTION

The polyesters used in this invention are essentially linear hydroxyl-terminated polyesters that are readily prepared, for example, by the esterification of a dicarboxylic acid with an aliphatic glycol. The basic polyesters utilized include polyesters prepared from the esterification of such dicarboxylic acids as adipic, succinic, pimelic, suberic, azelaic, sebacic and the like or their anhydrides. Preferred acids are those dicarboxylic acids of the formula HOOC—R—COOH, where R is an alkylene radical containing 2 to 8 carbon atoms. More preferred are those represented by the formula HOOC(CH$_2$)$_x$COOH where $x$ is a number from 2 to 10, more preferably 2 to 5. Adipic acid is particularly preferred. The glycols utilized in the preparation of the polyester by reaction with the aliphatic dicarboxylic acid are preferably straight chain glycols containing up to 10 carbon atoms such as butanediol-1,4,hexamethylenediol-1,6, octamethylenediol-1,8 and the like. In general the glycol is of the formula HO(CH$_2$)$_x$OH, wherein $x$ may be 2 to 10, and more preferably is about 4 to 8, as 4 to 5. Butanediol-1,4 is particularly preferred.

The poly(epsilon-caprolactone)diols are known and are the polyester reaction products of lactones and bifunctional compounds having two reactive sites capable of opening the lactone ring. These bifunctional materials are represented by the formula HX—R—XH wherein R is an organic radical which can be aliphatic, cycloaliphatic, aromatic or heterocyclic and X is O, NH and NR where R is a hydrocarbon radical which can be alkyl, aryl, aralkyl and cycloalkyl. Such materials include diols, diamines and aminoalcohols preferably. Useful diols include alkylene glycols wherein the alkylene group contains 2 to 10 carbon atoms for example, ethylene glycol, 1,2-propane diol, butanediol-1,4hexamethylene diol-1,6 and the like. Ethylene glycol provides excellent polyesters.

The lactones preferred for preparing the polyesters are epsilon-caprolactones having the general formula

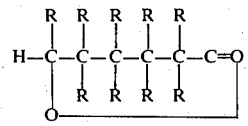

wherein at least 6 of the R's are hydrogen and the remainder are hydrogen or alkyl groups containing 1 to 10 carbon atoms, preferably methyl. Mixtures of lactones may be employed to form the polyesters as epsilon-caprolactone and trimethylepsilon-caprolactone, γ-methyl-epsilon-caprolactone, β-methylepsilon-caprolactone, dimethyl-epsilon-caprolactone and the like. The lactones are polymerized readily by heating with the bifunctional reactant at a temperature of about 100 to about 200°C. Catalysts may be employed if desired.

The polyesters will have average molecular weights determined by an analysis of terminal hydroxyl groups of from about 600 to about 1200, more preferably from about 800 to 1000. The poly(epsilon-caprolactone)diols will have molecular weights from about 400 to 600.

The added aliphatic diol or glycol will contain from about 5 to 10 carbon atoms for example, hexamethylenediol-1,6 and the like. The amount of diol used will be greater than about one mol per mol of polyesters to about 10 mols. Molar amounts in the range of about 1.5 to about 5 are generally preferred.

The diisocyanate must be an acylic or alicyclic diisocyanate containing greater than 6 carbon atoms in addition to the carbon atoms in the isocyanate groups. Hexamethylene diisocyanate, for example, is unsatisfactory in making polyurethanes having the required combination of physical properties for transfer coating. A particularly useful material is 4,4′-methylenebis-(cyclohexyl isocyanate). Other useful diisocyanates include those wherein the terminal isocyanate groups are linked by aliphatic or alicyclic radicals containing 8 to 14 carbon atoms. The molar ratio of diisocyanate used to polyester, lactone diol, aliphatic diol or glycol and hydroxyl-terminated siloxane should be essentially 1:1 molar equivalent of hydroxyl to isocyanate groups so that there is no substantial excess of isocyanate nor of terminal hydroxyl groups remaining after reaction. The preferred polyurethanes are prepared with substantially equimolar amounts of diisocyanate and polyester-lactone-glycol-siloxane and there should be less than about 5% excess of any of the reactants, more preferably less that about 1% excess diisocyanate.

It is an essential feature of this invention that the polyester be a blend of at least two polyesters of different molecular weights. For example, the base polyester is a polyester of, for example, dicarboxylic acid as adipic and a glycol as ethylene glycol or butanediol-1,4 having molecular weight in the range of about 800 to 1200. Used with this polyester is a poly(epsilon-caprolactone)diol having a molecular weight of about 400 to 600. The amounts of the two polyesters and aliphatic diol used are such that a blend of these have a molecular weight in the range of about 350 to 500 as determined by hydroxyl content and more preferably from about 400 to 475. Normally there will be used greater than about 0.5 up to about 10 moles of poly(epsilon-caprolactone)diol per mole of polyester and greater than about one mol of glycol to obtain the desired blend average molecular weight up to about 5 or more mols per mol of polyester.

The hydroxyl-terminated polydimethylsiloxane materials have molecular weights in the range of about 500 to about 3000, more preferably about 1200 to about 2200. These siloxane materials are fluid, stable to hydrolysis, are substantially colorless, have densities $D_{20/4}$ of about 1, contain about 2 to 4 weight percent hydroxyl groups, are insoluble in water and soluble in alcohols. The amounts used will be from about 0.005 to about 0.5, preferably about 0.01 to about 0.2 mol per mol of polyester.

In the preparation of the polyurethanes they may be prepared by any of those methods known to those skilled in the art including a melt or solution reaction. For example, the polyesters, aliphatic glycol or diol and siloxane may all be mixed together before reaction in the absence of substantial amounts of moisture under the influence of heat, usually greater than about 100°C., with a diisocyanate, or the various materials may be charged separately to a reactor for the reaction. The reaction may be partially completed in a reactor and finished in molds or forms if desired.

The solvents employed may be any solvents useful in dissolving polyurethanes, however, for commercial utility, use of the most inexpensive solvents is desired, for example, the ketones such as acetone or methylethyl ketone, diluted dimethyl formamide such as 50 DMF/50 toluene, tetrahydrofuran, dimethyl acetone and other polar solvents.

In preparing the polymers in the following Examples to demonstrate the practice of the invention the polyester, poly(epsilon-caprolactone)diol, hydroxyl-terminated dimethylpoly siloxane, and glycol were mixed together and under anhydrous conditions the diisocyanate added and the reaction conducted at a temperature up to about 225°–235°C.

The blocking test is run by first preparing a 20% solution of the polyurethane in a 1:1 dimethyl formamide/toluene solvent. A 15 mil wet film is cast on release paper and is dried in an oven for 45 minutes at 250°F. The samples are aged for 16 to 24 hours at room temperature and the film is then removed from the release paper. The film is about 1.5 mils in thickness when dried. 7 days after the film has been cast, the blocking tests are run. The film is placed on a glass plate in an oven at the indicated times, temperatures and pressures. The weight is distributed over a 1 square inch area and at the end of the blocking test the weight is removed and the film allowed to age for 10 minutes at room temperature. The blocking is then determined by peeling the film and the ratings determined as from none to severe.

EXAMPLES 1–4

Following the procedure described above, poly(tetramethylene adipate) glycols having the molecular weight shown in data Table 1 were mixed with poly(epsilon-caprolactone)diol having a molecular weight of 532, dimethyl polysiloxane, hydroxyalkyl terminated dimethyl polysiloxane having a molecular weight of about 1945 and 3% terminal hydroxyl groups, 1,6-hexanediol and 4,4'-methylenebis-(cyclohexyl isocyanate) in the weight percent and mol ratios shown in the table and reacted together. The resulting products were tested for tensile strength, elongation, modulus and hardness, solubility in a 50—50 mixture of dimethyl formamide/toluene to form a 20% solution and the blocking characteristics of film deposited from the solution, determined at room temperature and at 170°F. under one psi pressure for 30 minutes.

TABLE 1

|  | 1 | 2 | 3 | 4 |
| --- | --- | --- | --- | --- |
| Weight percent |  |  |  |  |
| Poly(tetramethylene adipate)glycol |  |  |  |  |
| 1069 molecular weight | 32.89 | 30.44 | — | — |
| 822 molecular weight | — | — | 36.30 | 36.07 |
| Poly(epsilon-caprolactone)diol | 15.18 | 15.22 | 16.02 | 15.91 |
| Hydroxyalkyl-terminated dimethylpolysiloxane | 2.53 | 5.07 | 1.07 | 1.06 |
| 1,6-Hexanediol | 10.36 | 10.34 | 8.37 | 8.54 |
| Blend molecular weight | 409 | 411 | 423 | 420 |
| Diisocyanate | 39.05 | 38.43 | 38.25 | 38.42 |
| Mols |  |  |  |  |
| Poly(tetramethylene adipate)glycol | 1.0 | 1.0 | 1.0 | 1.0 |
| Poly(epsilon-caprolactone)diol | 0.93 | 1.0 | 0.68 | 0.68 |
| Hydroxyalkyl-terminated dimethylpolysiloxane | 0.06 | 0.14 | 0.02 | 0.01 |
| 1,6-Hexanediol | 2.85 | 3.08 | 1.61 | 1.65 |
| Diisocyanate | 4.84 | 5.22 | 3.31 | 3.34 |
| Tensile, psi | 5950 | 4740 | 7100 | 7800 |
| Elongation, % | 530 | 500 | 560 | 550 |
| 300% Modulus, psi | 2620 | 2480 | 2600 | 2800 |
| Durometer A-D | 95–50 | 95–50 | 92–43 | 92–44 |
| DMF/toluene solubility | yes | yes | yes | yes |
| Blocking - paper side 73°F | very slight | very slight | very slight | very slight |
| 170°F./1 psi/30 min. | slight | slight | slight | slight |
| Blocking - air side | none | none | none | none |
| 170°F./1 psi/30 min. | none | none | none | slight |

EXAMPLES 5–7

Following the procedure described above, another series of polyurethanes demonstrating the practice of the Invention were prepared and tested. The data is in Table 2.

TABLE 2

|  | 5 | 6 | 7 |
|---|---|---|---|
| Weight percent | | | |
| Poly(tetramethylene-adipate)glycol | | | |
| 822 molecular weight | 34.69 | 37.22 | 34.59 |
| Poly($\epsilon$-caprolactone)diol | 16.29 | 17.48 | 16.25 |
| Hydroxyalkyl terminated dimethylpolysiloxane | 1.58 | 1.69 | 1.57 |
| 1,6-Hexanediol | 8.74 | 7.11 | 8.77 |
| Blend molecular weight | 415 | 456 | 413 |
| Diisocyanate | 38.70 | 36.49 | 38.81 |
| Mols | | | |
| Poly(tetramethylene-adipate)glycol | 1.0 | 1.0 | 1.0 |
| Poly($\epsilon$-caprolactone)diol | 0.73 | 0.73 | 0.73 |
| Hydroxyalkyl-terminated dimethylpolysiloxane | 0.02 | 0.02 | 0.03 |
| 1,6-Hexanediol | 1.76 | 1.33 | 1.77 |
| Diisocyanate | 3.51 | 3.08 | 3.52 |
| Tensile strength, psi | 8100 | 5950 | 8750 |
| Elongation, % | 400 | 390 | 400 |
| 300% modulus, psi | 4750 | 3560 | 4800 |
| DMF/Tol. solubility | yes | yes | yes |
| Fadeometer 200 hours | | | |
| Tensile strength, psi | 7200 | 5900 | 7080 |
| Elongation, % | 410 | 410 | 400 |
| 300% modulus, psi | 4330 | 3250 | 4700 |
| Fadeometer 500 hours | | | |
| Tensile strength, psi | 5300 | 5760 | 4300 |
| Elongation, % | 390 | 410 | 330 |
| 300% Modulus, psi | 3800 | 3100 | 3600 |
| Blocking-paper side 73°F. | none | none | — |
| 170°F./1 psi/30 min. | slight | slight | — |
| Blocking - air side 73°F. | none | none | none |
| 170°F./1 psi/30 min. | none | none | none |
| Solubility DMF/toluene | yes | yes | yes |

EXAMPLES 8–11

Following the general procedure described above four additional polymerizations were conducted according to the data set forth below with the results obtained in Table 3.

TABLE 3

|  | 8 | 9 | 10 | 11 |
|---|---|---|---|---|
| Weight percent | | | | |
| Poly(tetramethylene adipate)glycol | | | | |
| 866 molecular weight | 9.34 | — | 15.11 | 40.15 |
| 1819 molecular weight | — | 33.13 | 32.17 | 8.53 |
| Poly(epsilon-caprolactone)diol | | | | |
| molecular weight 545 | 43.94 | 15.56 | — | — |
| Hydroyalkyl-terminated dimethylpolysiloxane | 1.65 | 1.51 | 1.46 | 1.51 |
| 1,6-Hexanediol | 6.49 | 11.73 | 13.12 | 11.28 |
| Blend molecular weight | 417 | 426 | 425 | 418 |
| Diisocyanate | 38.59 | 38.08 | 38.14 | 38.53 |
| Mols | | | | |
| PTAE 866 molecular weight | 1.0 | — | 1.08 | 10.81 |
| PTAE 1989 molecular weight | — | 1.0 | 1.0 | 1.0 |
| Poly(epsilon-caprolactone)diol | 7.48 | 1.71 | — | — |
| Hydroyalkyl-terminated dimethylpolysiloxane | 0.48 | 0.05 | 0.05 | 0.18 |
| 1,6-Hexanediol | 5.10 | 5.97 | 6.87 | 22.30 |
| Diisocyanate | 13.66 | 8.73 | 9.0 | 34.28 |
| DMF/toluene/solubility | yes | insoluble | insoluble | insoluble |
| Tensile strength, psi | 6000 | — | — | — |
| Elongation, % | 380 | — | — | — |
| 300% Modulus, psi | 4050 | — | — | — |
| Blocking 73°F. | very slight | — | — | — |

It is evident from these data that an unsatisfactory material is obtained when the polyester has a molecular weight of about 1800 (9) and when there is no poly(epsilon-caprolactone)diol (10) present. Further, when these examples are repeated with 1,4-butanediol instead of 1,6-hexanediol, moderate to severe blocking is observed.

In another example made with one mol of poly(tetramethyleneadipate)glycol molecular weight 822 with 0.66 mol of poly(epsilon-caprolactone)diol molecular weight 532, 1.58 mols 1,6-hexanediol and 3.24 mols of the diisocyanate without, however, using the hydroxyalkyl-terminated dimethyl polysiloxane, while this polymer is soluble as desired in the solvent, the block characteristics are unsatisfactory being moderate at 170°F.

at 1 psi and 30 minutes with severe blocking being noted at 170°F., 5 psi, 60 minutes.

As a consequence of the novel combination of useful properties, particularly the solvent solubility and improved blocking characteristics, the polyurethanes of this invention find utility in coated fabrics, particularly where the fabrics are coated by means of a transfer coating process wherein a solution of polyurethane is employed. The polymers also have other utility in extruded and molded articles. As polyurethanes, they are amenable to compounding with normal compounding ingredients for polyurethanes known to those skilled in the art.

I claim:

1. A polyurethane comprising the reaction product of a hydroxyl-terminated polyester of a dicarboxylic acid and a glycol, said polyester having a molecular weight in the range of about 600 to 1200, a poly(epsilon-caprolacetone)diol having a molecular weight from about 400 to 600, an aliphatic diol containing about 5 to 10 carbon atoms, all when mixed together having a blend average molecular weight of between about 350 to 500, from about 0.005 to about 0.5 mol of hydroxyl-terminated dimethylpolysiloxane having a molecular weight in the range of about 500 to about 3000, a D20/4 of about 1 and containing about 2 to 4 weight percent hydroxyl groups per mol of polyester and an acyclic or alicyclic diisocyanate containing greater than 6 carbon atoms present in amounts substantially equivalent to the hydroxyl-terminated materials.

2. A polyurethane of claim 1 wherein the polyester is a polyester of a dicarboxylic acid of the formula $HOOC(CH_2)_xCOOH$ wherein $x$ is a number from 2 to 10, a glycol of the formula $HO(CH_2)_xOH$ wherein $x$ is 2 to 10, the aliphatic diol contains 5 to 8 carbon atoms and terminal hydroxyl groups and the diisocyanate is an alicyclic diisocyanate.

3. A composition of claim 2 wherein in the polyester in the acid $x$ is 2 to 5, in the glycol $x$ is 4 to 8, and the hydroxyl-terminated dimethylpolysiloxane has a molecular weight in the range of about 1200 to about 2200.

4. A polyurethane of claim 3 wherein in the polyester the acid is adipic acid, in the diol $x$ is 4 to 5, the aliphatic glycol is hexamethylenediol-1,6, the blend average molecular weight is about 400 to about 475, there is about 0.01 to about 0.2 mol of hydroxyl-terminated dimethyl polysiloxane having a molecular weight in the range of about 1200 to about 2200 and having a terminal hydroxyl content of about 3%, the alicyclic diisocyanate is 4,4'-methylenebis(cyclohexyl isocyanate) and the molar ratio of reactants is about one mol of polyester, at least 0.5 mol of poly(epsilon-caprolactone)diol and there is greater than about 1.5 mols of hexanediol-1,6.

5. A polyurethane of claim 4 wherein the molecular weight of the polyester is about 850 to 1050, the molecular weight of the lactonediol is about 450 to 550 present in amount of about 0.5 to 1.5 mols per mol of polyester, there is about 0.01 to 0.2 mols of hydroxyl-terminated dimethylpoly siloxane per mol of polyester, there is up to about 5 mols of hexanediol-1,6 and the reaction product is substantially free of isocyanate groups.

* * * * *